May 2, 1939. V. F. VOLK 2,156,366
DISPENSING CONTAINER
Filed April 13, 1938
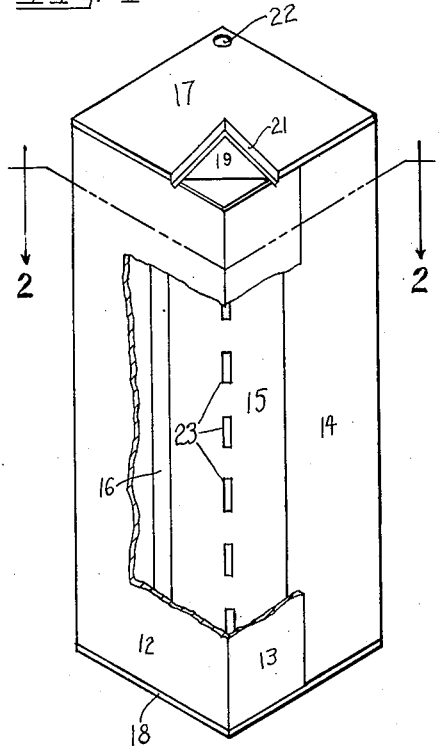
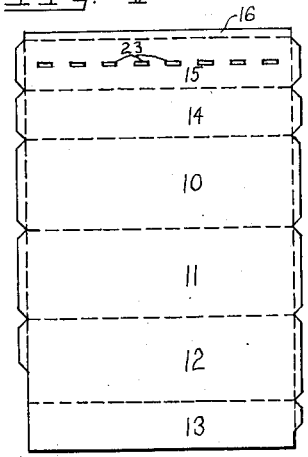
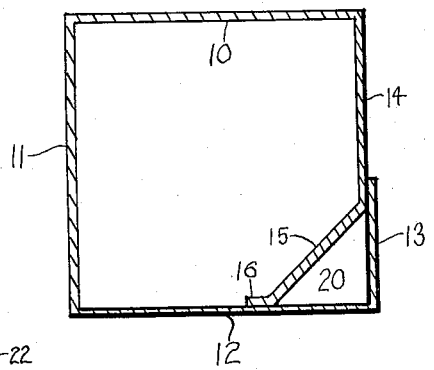
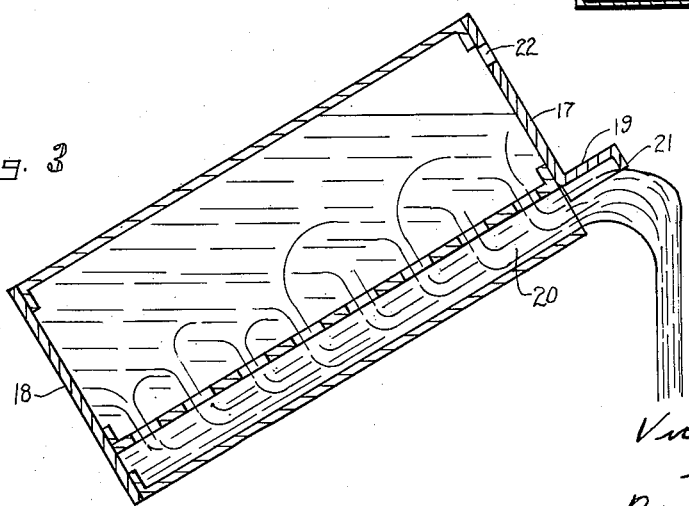
Inventor
Victor F Volk Patented May 2, 1939

2,156,366

UNITED STATES PATENT OFFICE 2,156,366

DISPENSING CONTAINER

Victor F. Volk, Brooklyn, N. Y.

Application April 13, 1938, Serial No. 201,652

6 Claims. (Cl. 229—17)

This invention is an improvement in shipping and dispensing containers for liquids composed of ingredients which tend to separate due to differences in specific gravity. I have in mind particularly whole milk from which a major portion of the cream collects at the top upon standing for a sufficient length of time, although my invention may be employed for tomato juice and other juices and potable liquids containing solids in suspension or other ingredients which may settle to or toward the bottom or rise to or toward the top when left standing.

My invention relates to that type and size of container in which a unit portion such as a pint or quart of the milk or other liquid may be delivered to the consumer and which may be tilted to pour out successive portions of the liquid from the top into drinking glasses.

The main object of the invention is to provide means whereby one may be sure of obtaining successive portions of the liquid, each portion being typical in composition to the entire contents of the container rather than representative of only one layer in case segregation has taken place in the container. With my improved container there is no necessity for stirring up the entire contents or shaking the container with its contents to render the latter homogeneous.

A further object of the invention is to provide a container which may be employed to obtain the object above referred to and which at the same time may be manufactured at sufficiently low cost to permit of its being thrown away when empty, rather than being returned to the filling plant for reuse.

In carrying out my invention I provide the container with a dispensing passage extending from the top to the bottom and which communicates with the main body of the interior of the container at all or substantially all levels, and which communication is sufficiently restricted in respect to the cross-sectional area of the passage that upon tilting of the container to pour out a portion of the contents through the passage and from the open upper end of the latter, the flow into the passage will be at a substantially equal rate from all levels and the liquid delivered will be drawn from all levels and be a substantially homogeneous mixture of all of the ingredients even though such ingredients were present in two or more layers of different composition or concentration.

The passage may be formed in the corner of a container polygonal in cross-section or as a segment along one side of a container circular in cross-section, or it may be formed on the outside of the main body of the container regardless of the cross-sectional area. If the container be conical or if it have a top or a neck very much smaller than the main body portion, the passage may be formed independently of the main walls and extend from the small top or neck downwardly through the center of the container to the bottom.

Preferably the partition or other wall which in whole or in part defines the passage, has a series of small apertures spaced apart along its length although the communication may be in the form of a single aperture or slit extending the full length of the passage. A simple way of forming such a slit is to leave one edge of the partition defining the passage spaced slightly from a wall of the container. Where separate apertures are employed they may be progressively smaller or with greater spacing toward one end of the passage, and where the communication is in the form of a slit, this may be slightly wider at one end than at the other, depending upon the relative resistance to flow of the separated ingredients or of the portions of different composition or concentration.

In order that the outflow representative of the entire composition may be uniform, the rate of flow into the passage during the pouring of liquid from the upper end of the passage should be substantially uniform at all points along the length of the passage, and the total cross-sectional area of the communication between the body of the container and the passage should not be such as to permit the passage to be supplied at a greater rate from one level than from the other levels.

In the accompanying drawing I have illustrated merely one embodiment of my invention and I desire this to be considered as illustrative rather than as limiting. In the drawing:

Figure 1 is an isometric view of the container, a portion of the outside wall being broken away and the closure for the upper end of the passage being shown in open position:

Figure 2 is a transverse section on the line 2—2 of Figure 1;

Figure 3 is a central vertical section of the container in dispensing position; and Figure 4 is a plan view of a blank which may be employed to form the peripheral wall and partition of the container.

In the specific form illustrated, the body of the container and the partition are formed from a single sheet of relatively stiff water-proof material such, for instance, as heavy cardboard coated with paraffin or other water-proofing material. This has score lines along which it may be bent in forming the container. These score lines define three main side walls or panels 10, 11 and 12. At the edge of the panel 12 there is a narrower panel 13 forming a portion of the fourth side wall of a rectangular container, and at the edge of the panel 10 is a panel 14 which may cooperate with the panel 13 to form said fourth wall. At the edge of the panel 14 is a section 15 which may be folded inwardly to form a partition across one corner of the container. The edge of the panel section 13 may overlap a portion of the panel section 14 so as to be secured thereto by suitable adhesive, and the edge of the panel 15 has a flange 16 which may be secured to the inner surface of the panel 12. Thus, the entire peripheral wall as well as the partition may be easily and economically formed from a single sheet of material.

The manner in which the top and bottom walls of the container are formed constitutes no essential or novel portion of my invention. As illustrated, the various panels have end flanges which may be turned in at right-angles and these may be secured to top and bottom walls 17 and 18. Any other desired method of forming such end walls may be provided.

As illustrated the top wall 17 includes a triangular corner flap 19 of a shape and size substantially corresponding to the triangular passage 20 formed between the panel section 13, the partition 15, and a portion of the panel 12. This flap may serve as a hinged closure for the upper end of the passage and may have marginal flanges 21 aiding in normally holding the closure in the closed position. Any other suitable closure for the upper end of the passage 20 may be provided such, for instance, as a plug of triangular or other shape corresponding to the shape of the passage 20. If desired the entire top wall 17 may be in the form of a cap which is entirely removed during dispensing. Where the top wall is permanently attached except across the upper end of the passage, it is preferably although not necessarily provided with an air inlet opening 22 disposed adjacent to the diagonally opposite corner from the passage 20 to admit air to the container during the dispensing of the contents and to prevent gurgling or the admission of air to the container through the upper end of the passage 20 during dispensing.

As the important feature of the invention the partition 15 is provided with a series of apertures 23 spaced apart along the length thereof and establishing communication between the passage 20 and the main body of the container. As previously noted the cross-sectional area of these should be such as will insure a substantially uniform inflow of liquid from all layers of the liquid in the body portion when the container is tilted to pour out liquid from the upper end of the passage 20. I do not desire to be restricted to the particular shape or number of such passages or to the spacing thereof provided they accomplish the desired result.

It will be noted that during all stages of the dispensing operation the passage 20 will be completely filled until the container is substantially empty, if the extent of tilting be increased so as to keep the level of the liquid in the body of the container above the level of the liquid in the passage. At all times the hydrostatic head on the liquid upon opposite sides of the partition will be substantially the same. This is not the case if the dispensing is done without tilting and by opening a faucet or other dispensing outlet at the bottom of the passage. By this maintenance of the hydrostatic head the draining from all levels is effectively insured.

As a further advantage of the construction, the container may be tipped in the opposite direction and pour out slowly from the opening 22, in case it is desired to remove only the top layer, for instance, the separated cream from the milk. If it is desired to draw off only the bottom layer the container may be moved to a horizontal position with either the passage 20 or the port 22 lowermost, and after standing for some time, the closure of the lower port may be opened and liquid drawn from the lower layer.

Although I have referred to the container as being formed of a water-proofed fibrous material such as paraffin-coated paperboard, it will be evident that the container might be formed of sheet metal or any other suitable material provided the expense is sufficiently low to permit the container to be thrown away when empty. In some cases it may be desirable to ignore this element of cost and make the container of a type adapted to be returned and refilled. It will be understood that in the drawing the thickness of the wall is shown exaggerated in the interest of clarity. It will also be understood that if the air port 22 be employed, suitable closure means therefor will be provided. Such means may be a plug or stopper which may be removed or a paster or flap which may be removed or punctured.

Having thus described my invention, what I claim as new and desire to secure by Letters Patent is:

1. A container for liquid tending to separate into layers of different composition or concentration of an ingredient, said container having a main chamber and a passage extending from the top to the bottom and having restricted communication with said main chamber along the length of said passage, the upper end of said passage having a dispensing outlet from which the contents of said chamber may be dispensed substantially uniformly from various levels in the container upon tilting said container, and means for normally closing said outlet.

2. A dispensing container for liquids tending to separate into layers of different composition or concentration of an ingredient, said container having a main chamber and a passage extending from the top to the bottom, the wall of said passage having a series of spaced apertures along the length thereof, and the upper end of said passage having a dispensing outlet from which the contents of said chamber may be dispensed substantially uniformly from various levels in the container upon tilting said container, and means for normally closing said outlet.

3. A dispensing container for liquids tending to separate into layers of different composition or concentration of an ingredient, said container having a main chamber and a passage extending from the top to the bottom, the wall of said passage having a series of spaced apertures along the length thereof, the total cross-sectional area of said apertures being not substantially greater than the cross-sectional area of said passage, and the upper end of said passage having a dispensing outlet from which the contents of said chamber may be dispensed substantially uniformly from various levels in the container upon tilting said container, and means for normally closing said outlet.

4. A dispensing container for liquids including a main chamber polygonal in cross-section and having a vertically extending partition, forming with the walls of said container a passage along one corner, said partition having a series of spaced apertures along the length thereof and a removable closure for the upper end of said passage.

5. A dispensing container for liquids, having a peripheral wall and a partition, forming with said wall a passage extending vertically from the top to the bottom and having restricted communication along the length thereof with the main chamber of said container whereby upon tilting the container the contents from all levels thereof may be dispensed through the upper end of said passage, and means for normally closing said upper end.

6. A dispensing container for liquids tending to separate into layers of different composition or concentration of an ingredient, said container having a main chamber, an auxiliary wall forming with the peripheral wall a vertical passage extending from the top to the bottom of the container and having restricted communication along the length thereof with the main chamber, said container having a top provided with a pair of diametrically opposite openings, one registering with the upper end of said passage.

VICTOR F. VOLK.